(12) United States Patent  (10) Patent No.: US 12,263,960 B2
Zahariev  (45) Date of Patent: Apr. 1, 2025

(54) SYSTEM FOR DEPLOYABLE SOLAR PANELS FOR NANOSATELLITES

(71) Applicant: "Endurosat" Joint Stock Company, Sofia (BG)

(72) Inventor: Zaharilliev Zahariev, Sofia (BG)

(73) Assignee: "Endurosat" Joint Stock Company, Sofia (BG)

( * ) Notice: Subject to any disclaimer, the term of this patent is extended or adjusted under 35 U.S.C. 154(b) by 0 days.

(21) Appl. No.: 18/023,612

(22) PCT Filed: Feb. 11, 2021

(86) PCT No.: PCT/BG2021/000006
§ 371 (c)(1),
(2) Date: Feb. 27, 2023

(87) PCT Pub. No.: WO2022/047551
PCT Pub. Date: Mar. 10, 2022

(65) Prior Publication Data
US 2023/0312140 A1 Oct. 5, 2023

(30) Foreign Application Priority Data
Sep. 2, 2020 (BG) ........................................ 113224

(51) Int. Cl.
*B64G 1/22* (2006.01)
*B64G 1/44* (2006.01)

(52) U.S. Cl.
CPC .............. *B64G 1/222* (2013.01); *B64G 1/443* (2013.01)

(58) Field of Classification Search
CPC ...... B64G 1/222; B64G 1/443; B64G 1/2224; B64G 1/2228; Y02E 10/50
See application file for complete search history.

(56) References Cited

U.S. PATENT DOCUMENTS

2019/0039758 A1* 2/2019 Fuller .................. B64G 1/2228

FOREIGN PATENT DOCUMENTS

CN 107933972 A * 4/2018 ............... B64G 1/44
CN 210707968 U * 6/2020

OTHER PUBLICATIONS

English machine translation of CN-107933972-A (Year: 2024).*
English machine translation of CN-210707968-U (Year: 2024).*

* cited by examiner

*Primary Examiner* — Angelo Trivisonno
(74) *Attorney, Agent, or Firm* — Inventa Capital Group PLC

(57) ABSTRACT

This invention relates to a system for deploying solar panels for nanosatellites, which will find application in science, in space research, and in particular in the equipment of nanosatellites of the CubeSats type. The developed system for deploying solar panels for nanosatellites consists of a fixing connection (11) for keeping the solar panels in a folded state and a hinged connection (10) for forming the solar panels in a common platform. The hinged connection (10) is formed as a hinge, including a central double-walled axis (9), on which a primary torsion spring (4) is centrally mounted, to which central double-walled axis (9) also the second arm (8) and the first arm (7) are connected in series. At one end of the central double-walled axle (9) are made channels for fixing by means of locking rings (6) of a ratchet gear (1), constantly in contact with a support pin (5) under the influence of a secondary torsion spring (3) mounted on axle (2), which is mounted to the first arm (7).

2 Claims, 5 Drawing Sheets

SYSTEM FOR DEPLOYABLE SOLAR PANELS FOR NANOSATELLITES

FIELD OF THE INVENTION

This invention relates to a system for deployable solar panels for nanosatellites, which will find application in science, space research, in the development of communication systems and in particular in the equipment of nanosatellites of the CubeSat class.

BACKGROUND OF THE INVENTION

A satellite, often called an artificial satellite, is a man-made machine operating in orbit around the Earth (or outer Space). Satellites are used in many different fields, including communications, Earth observation, scientific and technological experiments, meteorology and more. Satellites are crucial for modern communication systems. Satellites also have a strategic role in navigation—to determine the location of objects on the Earth's surface. Satellite navigation services are also used in smartphones.

Satellites can be classified based on their mass. Depending on their size and mass, satellites can be large satellites, microsatellites, nanosatellites, picosatellites and others. Smaller and lighter satellites allow a simpler design, use modern mass production methods, and require less space on board launch vehicles. Currently, nanosatellites are used primarily by universities, research and development centers and private companies.

CubeSats models are among the most popular nanosatellites, which became very popular a few years ago due to their extremely affordable price per single mission, compared to larger satellites. The concept of this type of spacecraft is based on the idea that humanity can learn much more about space if it uses networks of miniature satellites instead of single large and complex orbiters.

The main technical challenges in creating small satellites include the lack of a sufficiently powerful power supply system and energy generation and storage system.

SUMMARY OF THE INVENTION

It is an object of the invention to provide a system for deployable solar panels for nanosatellites, which provides the possibility to unite single solar panels in a common platform, their retention in a retracted state and subsequent possibility for deployment and using the solar panels as a single unit on the satellite body structure.

The problem is solved by creating a system for deployable solar panels for nanosatellites, which consists of a fixing connection for holding solar panels in a folded state and a hinged connection for forming the solar panels in a common platform. The hinged connection is formed as a hinge comprising a central double-walled axis on which a primary torsion spring is centrally mounted, to which central double-walled axis a second arm and a first arm are connected in series. At one end of the central double-walled axis, grooves are made by means of ratchet gear retaining rings. The ratchet gear is in contact with a support pin under the influence of a secondary torsion spring, which is fixed on an axle mounted to the first arm.

An embodiment of the hinge is possible, which includes an additional torsion spring located opposite the primary torsion spring mounted to the second arm.

An advantage of the created system is the provided possibility, by means of the constructed hinge, series of solar panels to be connected in a solar array connected to the satellite body. In addition, the hinge allows to achieve the maximum area after the deployment of the solar panels in the final working position, with a minimum occupied area in the closed state, which is extremely important for nanosatellites.

BRIEF DESCRIPTION OF THE FIGURES

This invention is illustrated in the accompanying drawings, in which:

FIG. 3b is a top view of the hinge of FIG. 3a;

FIG. 4 is a side view of the hinge of FIG. 3a;

FIG. 5 is a rotated sectional view C-C of FIG. 3a; and

DETAILED DESCRIPTION OF EMBODIMENT OF THE INVENTION

Figure 1:
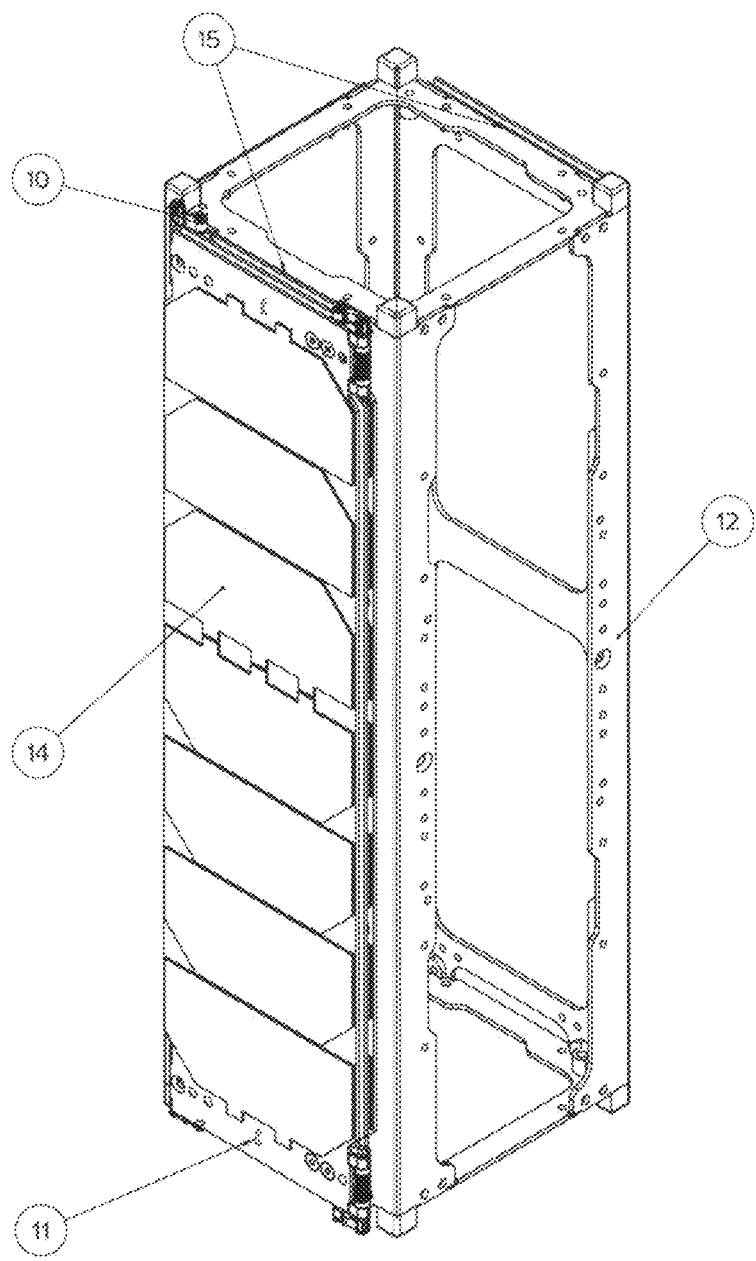
FIG. 1 is a general view of folded solar panels on a satellite body.
Figure 2A:
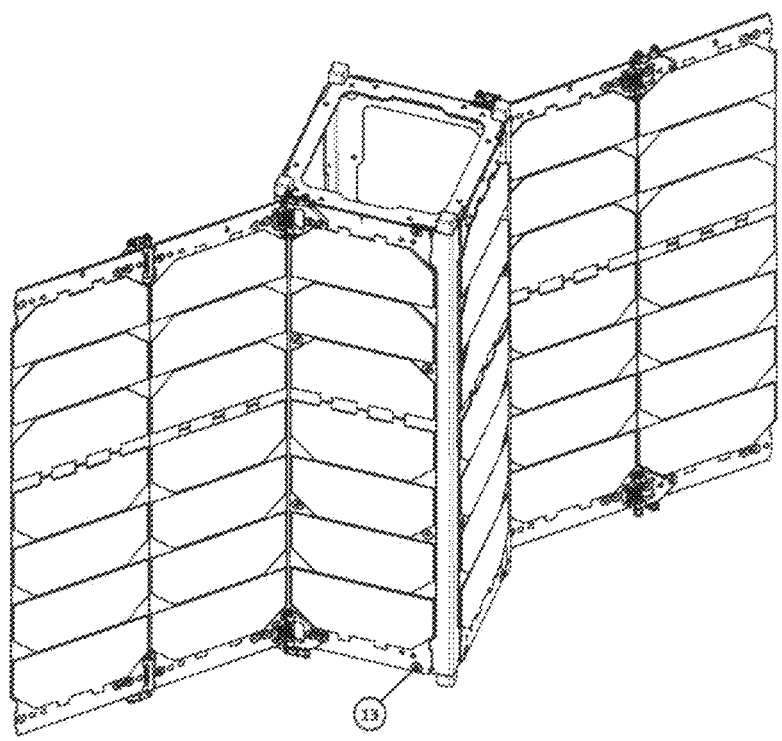
FIGS. 2a and 2b represent deployable solar panels.
Figure 2B:
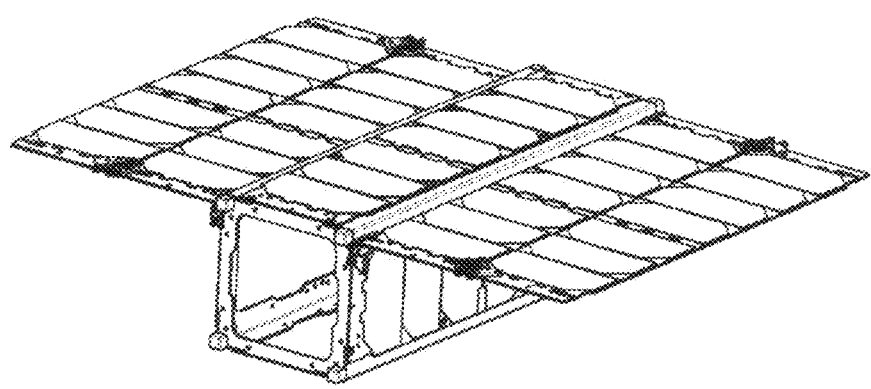

The developed system for deployable solar panels for nanosatellites, shown in FIGS. 1, 2a and 2b, consists of a fixing connection 11 for holding the solar panels 14 in a folded state and a hinged connection 10 for forming the solar panels 14 in a common platform. The series of solar panels 14 are connected as a single solar array; one of the solar panels, which is connected to the satellite body 12, is deployable and is called a stationary satellite panel 15. The fixing connection 11 and the hinged connection 10 ensure retention of the solar panels 14 in a folded position with the possibility of their deployment and use as a single unit. Thus combined, the solar panels 14 are connected to the satellite body 12 by means of screws 13. The retention of the solar panels 14 in the folded position is carried out by means of a fixing cord 11, and their release is carried out by breaking or burning the fixing cord 11 by means of a thermal component, heated to a temperature in the range of 80-250° C. After releasing the fixing cord 11, the solar panels 14 are subsequently deployed by means of the hinged connection 10 until reaching the preset geometric configuration of 90°/135°/180° in order to achieve the maximum effective area.

Figure 3A:
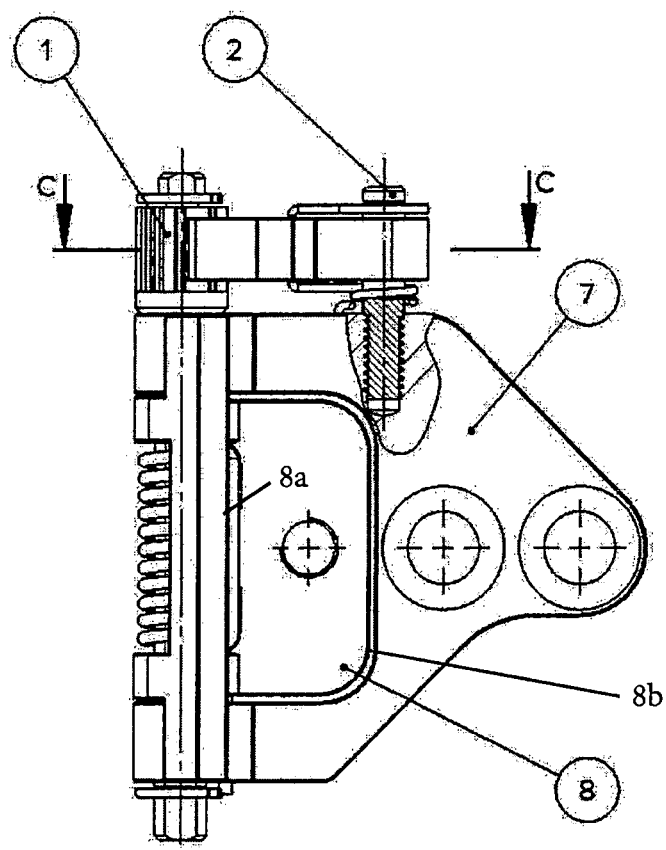
FIG. 3a is a general sectional view of the hinged connection shaped like a hinge from a nanosatellite solar panel deployment system.
Figure 3B:
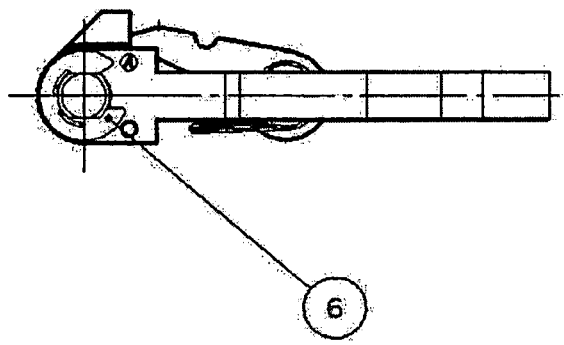
Figure 4:
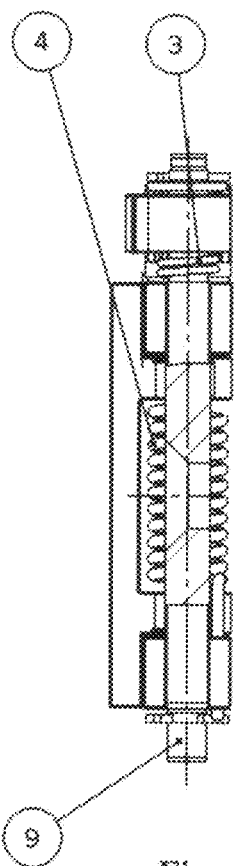
Figure 5:
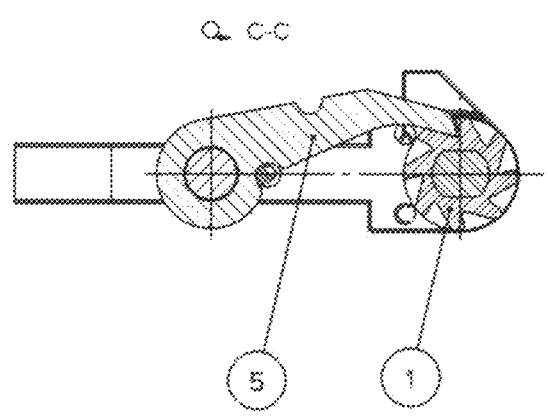
Figure 6:
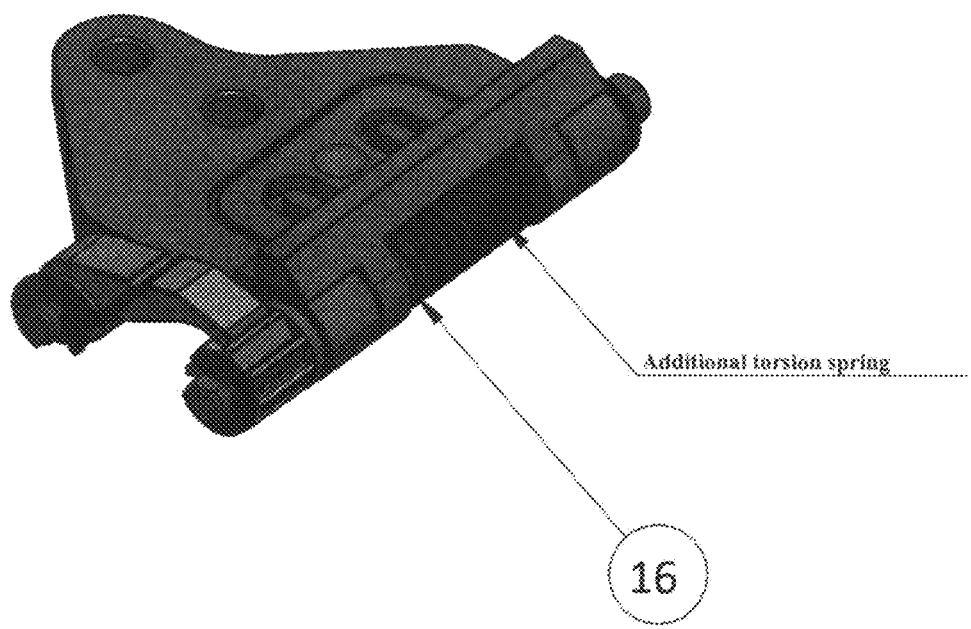
FIG. 6 is an axonometric view of the hinge with an additional torsion spring.

The hinged connection 10 is formed as a hinge, shown in FIGS. 3a, 3b, 4 and 5, including a central double-walled axis 9 on which a primary torsion spring 4 is centrally fixed. The central axis 9 has two parallel walls which uniquely define the connection of a second arm 8 with consecutive connection of the first arm 7 as well. As shown in FIG. 3a, the second arm 8 has a connecting edge 8a that is coupled to the central axis 9 and an extension edge 8b extending from the connecting edge 8a. At least when the solar panels are in the folded position, as shown in FIGS. 3a and 6, the second arm is co-planar with the first arm 7 such that the extension edge 8b of the second arm 8 is surrounded by the first arm 7. At one end of the central double-walled axis 9 grooves are made for fixing through retaining rings 6 of the ratchet gear 1. When deploying the solar panel 14, the central axis 9 is simultaneously rotating, with which the ratchet gear 1 also rotates simultaneously, in constant contact with the support pin 5 under the action of a secondary torsion spring 3 fixed on axle 2, which is mounted to the first arm 7. The construction of the hinge 10 is such that when rotating the second arm 8 at 45°, the support pin 5 is rotated simultaneously, followed by the prevention of the rotation of the second arm 8. The hinge 10 is designed as a drive mechanism that ensures the achievement of maximum effective area after deploying the solar unit.

Due to the state of microgravity—weightlessness, when used in space, the spring mechanisms create characteristic amplitude oscillations (oscillations) during their release, i.e. when activated in working condition, known as jitter. This is due to the lack of a damping environment, such as the Earth's air.

The solar panel and the satellite can be considered as two separate bodies connected by a connection (hinge), which bodies after activating the hinge will have a momentum relative to each other and will move (oscillate) relative to their common center of mass. Although such vibrations are attenuated due to dissipation in the spring itself, its inhomogeneity and external influences, such as pressure from solar radiation, aerodynamic friction, or the influence of the Earth's magnetic field, can continuously feed these vibrations. All these effects create torques that can consistently lead to further amplification of the amplitude of the oscillations and affect the final direction of the satellite for purposes such as: Earth observation; precise astronomical observations; other applications that require targeting accuracy of the order of 0.01-0.1 degrees.

An embodiment of the hinge 10 shown in FIG. 6 is possible, in which an additional torsion spring 16 is included, located opposite the primary torsion spring 4 mounted to the second arm 8. The use of two primary springs: a primary torsion spring 4 and an additional torsion spring 16, located opposite each other and mounted on the second arm 8 with different resistance coefficients, leads to a decrease in the effective spring coefficient, which is a prerequisite for increasing the damping coefficient of the hinge mechanism 10, and accordingly the solar panels 14 will be positioned to the set geometric configuration of 90°/135°/180° without additional oscillations.

The efficiency of the created system is expressed in the possibility of the solar panels to be used as a single unit, without being tied to a certain geometry of the main structure, which provides the possibility to achieve maximum delivered or accumulated power in the deployed state of the array when the sun is orthogonal relative to the solar array.

What is claimed is:

1. A system for deployable solar panels for nanosatellites, the system comprising:
   a fixing connection for holding a plurality of solar panels in a folded state; and
   a hinged connection for retaining the solar panels in the folded state and deploying the solar panels in an unfolded state forming the solar panels in a common platform, the hinged connection being formed as a hinge comprising:
   a central axle having a primary torsion spring mounted thereon, the central axis being connected to a second arm and a first arm disposed in series relative one another, the second arm having a connecting edge being coupled to the central axle and an extension edge extending from the connecting edge, wherein the second arm, at least when the solar panels are in the folded state, is co-planar with the first arm such that the extension edge of the second arm is surrounded by the first arm;
   wherein one end of the central axle includes a ratchet gear secured by a retaining ring, the ratchet gear being in contact with a support pin rotationally controlled by a secondary torsion spring that is mounted on a second axle coupled to the first arm.

2. The system for deployable solar panels for nanosatellites of claim 1, wherein the hinge comprises an additional torsion spring disposed opposite the primary torsion spring and being mounted to the second arm.

* * * * *